March 26, 1957    F. ORFEI ET AL    2,786,542
ANTI-FLOOD FLOAT VALVE
Filed Dec. 27, 1955
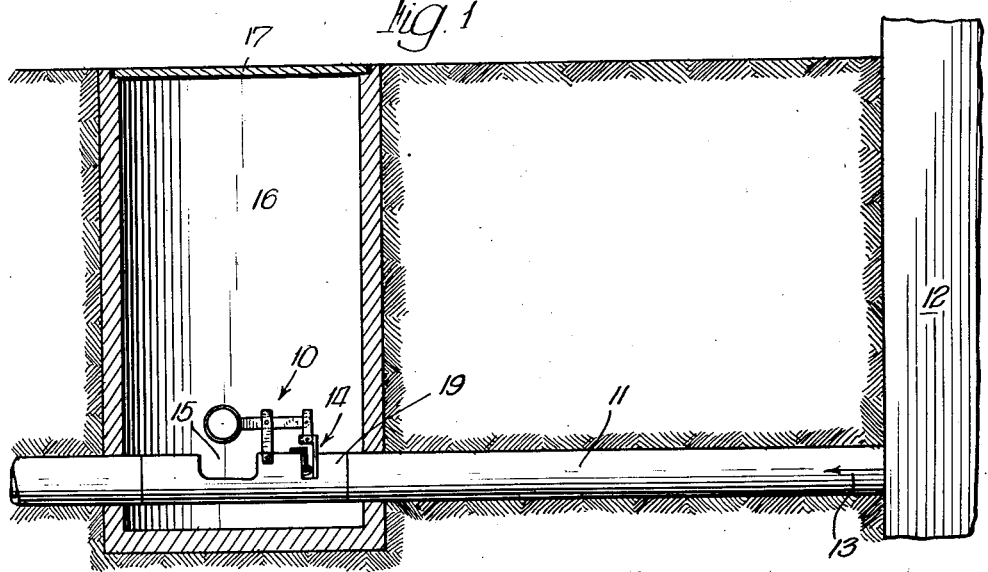
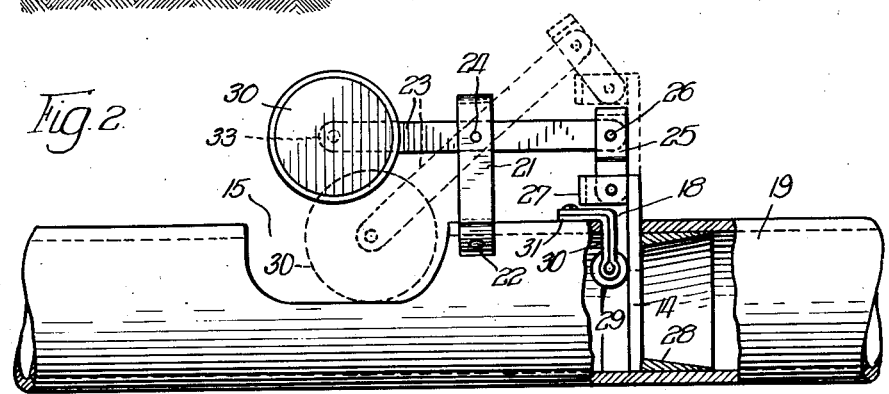
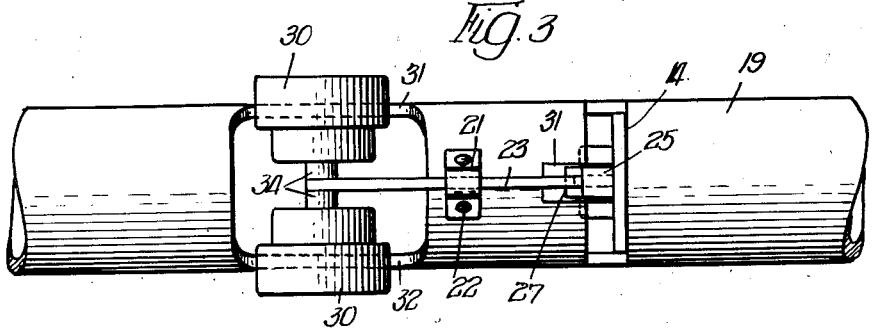
INVENTORS
Felix Orfei,
Peter Settimi,
BY

2,786,542

ANTI-FLOOD FLOAT VALVE

Felix Orfei, Melrose Park, and Peter Settimi, Bellwood, Ill.

Application December 27, 1955, Serial No. 555,504

1 Claim. (Cl. 182—26)

This invention relates to anti-flood valves and more particularly to means that may be utilized in a pipe line leading from a dwelling house or other building to the sewer main to prevent backwash from the sewer main through said pipe line flooding the basement of such a dwelling house or other building.

Devices for such purposes are not unknown in the art, but for the most part are relatively complicated in nature and suffer from the disadvantage that their operation is seriously hampered by the presence of refuse such as twigs and other debris in the flood waters which tend to be caught by the gate and prevent it from completely closing.

It is therefore a principal object of the present invention to provide such a valve that will be comprised of a minimum number of parts and further in which the valve gate will work in a rectilinear direction transversely of the flow of the flood waters so that the possibility of refuse such as twigs or the like being caught by the gate to prevent its closure is made relatively remote. It has been found that the effect of this rectilinear movement of the gate downwardly into a moving pool of water has the effect of pushing aside rather than catching such refuse and so having the desired result of permitting the gate to completely close.

A further object of the invention is to provide an annular seat against which the valve gate may be urged by the presence of the flood water after the gate has closed so that there is no possibility of the flood waters passing through and damaging the dwelling or building with which the pipe line communicates.

A further and principal object of the invention is to provide means whereby the closing of the valve gate will be controlled substantially automatically by the presence of the flood waters. This is obtained by locating the valve in a catch basin and providing a cut-out in the pipe behind the valve gate through which the flood waters may be shunted into the catch basin. In adjacent relation with such a cut-out are provided float means which may be used to actuate a lever arm having its opposed end operating the valve gate. It is thus contemplated that the flood waters themselves, in raising the float means, will act to pivot the lever arm about its fulcrum and lower the valve gate to close the opening through the valve or pipe line.

It has been found particularly advantageous to so locate the float means that in the open position of the valve they will assume a stable position of rest on the ledges formed by the opposed sides of the pipe in said cut-out rather than resting in the muck, sludge, etc., that accumulates on opposite sides of the pipe. In the latter instance there is the possibility that the floats will either be caught in the sludge or may come to rest on top of the sludge so as to prevent a complete opening of the valve gate. These possibilities are avoided in the arrangement contemplated in the present invention. Moreover, the floats do not interfere with the normal flow of sewage through the pipe since the cut-out is preferably to a depth of roughly a third of the pipe, the remaining two-thirds height of the pipe being adequate under normal circumstance to channel the flow of sewage therethrough.

Many other objects and advantages of the invention will be apparent from the more specific description thereof which follows. It is further to be understood that the following description is not to be taken in a limiting sense but merely as illustrative of one embodiment the invention may take.

In the drawing:

Figure 1 illustrates the use of the invention in conjunction with a catch basin and with the valve gate closed to prevent flooding by back wash from the main sewer;

Figure 2 is a slightly enlarged side elevational view of the valve embodying the invention and partly in section to illustrate the valve seat, the normal open position being shown in dotted lines and the closed position of the valve in full lines; while Figure 3 is a top plan view of the device.

Referring first to Figure 1 of the drawing, valve 10 will be seen as located in that part of a pipe line 11 leading from the basement of a dwelling or other building 12 to a sewer main, the normal flow of sewage being in the direction indicated by arrow 13. Said valve 10 includes a gate 14 for cutting off the flow of the back wash from the sewer main through pipe line 11 into the basement 12 and has a cut-out 15 in the upper portion thereof through which said back wash or flood waters may be shunted into a cistern or catch basin 16. Said catch basin is usually dug to approximately six feet or other depth at which the sewer pipe 11 is laid and may have a diameter of roughly two or three feet. Preferably, its walls are of stone, concrete, concrete blocks, bricks or other construction and is capped by a suitable cover 17 which may be of metal or constitute a reinforced concrete slab.

The valve 10 as seen most clearly in Figures 2 and 3 may be built into a section of the pipe line 11 by providing the same with a cut-out 15 and a slot 18 and the hereinafter described mechanism for operating gate 14 in slot 18 or it may be formed as a separate member 19 having its opposed ends adapted to be connected with the pipe line 11. In the latter case it may be assembled in the pipe line 11, either at the time of the construction of the cistern walls 17 or after the cistern has been completed. In addition to the cut-out portion 15 provided in the upper portion of pipe 19 constituting valve 10 for shunting the flood waters, said pipe 19 will also have the mentioned slot 18 in the top thereof through which valve gate 14 operates. Said valve gate 14 is operated by means of a lever arm 23 which is pivotally mounted on a support 21 in turn secured to the top of the pipe section 19 between said slot 18 and cut-out 15 by means of bolts, rivets or the like. Lever arm 23 is pivotally mounted thereon by means of a pin or the like 24, so as to swing about a horizontal axis. Gate 14 preferably comprises a flat disc of metal shaped along its bottom and sides to substantially the shape of the opening through the pipe section 19 and includes a portion 27 at its top which is pivotally secured to one end of a suitable linking member 25, the latter also having its opposed end pivotally connected to the free end of the lever arm 23 at 26. On the opposed ends of lever arm 23 are secured a pair of floats 30 which are adapted to be raised by the back wash from the sewer main to in turn pivot lever arm 23 about its horizontal pivot 24 to lower valve gate 14 into the valve pipe 10. Roller 29 carried on an L-shaped bracket 30 secured by rivets or screws 31 to the top of the pipe section 19 cooperates with annular seat 28 to guide gate 14 in a rectilinear path as it vertically descends into the onrushing flood waters from the sewer main so as to push aside any floating or moving debris, and becoming firmly and cleanly lodged against seat 28 under the pressure of said flood waters. Said link 25, and lever arms 23 as well as height of pivot 24 from the top of the valve pipe 19 are so controlled that when the floats 30 rest on the edges 31 and 32 of the pipe section 19 formed by cutting out portion 15, the valve gate 14 can be raised to a position leaving approximately three-quarters of the opening through the valve pipe section 18 open for free flow of sewage therethrough. In the raised position of said gate 14, roller 29, however, still remains in contact therewith to confine the movements of said gate 14 to said mentioned substantially rectilinear or vertical movement transversely of the flow of fluid through the pipe. Because of the heavy weight of gate 14 which is preferably formed of brass or other non-corrosive metal, weights 34 of lead or other suitable material are mounted on rod 33 which connect the floats 30 to said lever arm 23. These weights 34 serve to balance the weight of the valve gate so that during normal flow of sewage through the pipe section 18 the floats 30 will assume a stable position of rest on ledges 31 and 32 to hold the valve gate 14 in its open raised position.

This is indicated by the dotted line showing in Figure 2 and represents the normal position of the valve. However, for example, when a heavy rainfall in the spring of the year fills the sewer mains to overflowing with accompanying back wash and flooding into pipe line 11, floats 30 will be floated off said ledges by the rising flood waters to automatically lower gate 14 to the position shown by the full lines in said Figure 2 and thus prevent further procession of the flood waters therebeyond with resultant damage to the building or home. Instead, the flood waters are caused to exit through the cut-out 15 into catch basin 16, the valve gate 14 remaining closed until the sewer main is able to receive said flood waters whereupon the flood water temporarily stored in the catch basin 16 recedes back through the cut-out 15 and into the pipe line 11. As said water recedes the floats 30 also return to their position of rest on ledges 31 and 32 pivoting lever arm 23 to raise valve gate 14 and again allow normal flow of sewage through the valve 19.

It will thus be apparent that all of the objects of the invention have been achieved in a simple and practical manner and that the device herein described is both efficient and effective and that through its installation automatic assurance can be had against flooding of cellars and dwellings through the back wash of sewage or water from a sewer main with which the pipe line is connected for disposal of sewage from the dwelling or the like.

Thus having described our invention, we claim:

An anti-flood valve comprising a pipe-like member containing a cut-out and a spaced slot in the upper portion thereof, said member being adapted to be horizontally located within a catch basin or the like and in a pipe line leading from a sewer main with its slot adjacent the receiving end of said member which is directed away from said sewer main, a lever arm pivotally mounted on said member intermediate said slot and cut-out, a gate pivotally carried by the adjacent end of said lever arm and adapted for rectilinear movement in said slot to open and close the opening through said member, an annular valve seat disposed in the opening through said pipe-like member adjacent said slot and on the side thereof toward the receiving end of the pipe-like member, guide means including a roller carried by the pipe-like member within and adjacent the top of the opening through said member on the opposed side of the slot to hold the gate against said valve seat, the movement of said gate being so limited that some portion thereof is always being urged by the roller against the valve seat, and float means carried by the other end of said lever arm and located to rest on the top edge of the opposed sides of the section of pipe below said cut-out, said lever arm functioning when said float means is at rest on said top edges to hold the gate in a raised position allowing free flow through the valve to the sewer main, and said float means being adapted to be raised off said edges by water entering the pipe line from the sewer main which will operate said lever arm to lower the gate and close the opening through said member whereby said water will be prevented from passing beyond the valve.

References Cited in the file of this patent
UNITED STATES PATENTS

| | | |
|---|---|---|
| 542,417 | Lenhart | July 4, 1895 |
| 1,732,319 | Wagner | Oct. 22, 1929 |
| 2,431,640 | Gordon | Nov. 25, 1947 |